United States Patent
Majumdar

(10) Patent No.: US 8,850,146 B1
(45) Date of Patent: Sep. 30, 2014

(54) BACKUP OF A VIRTUAL MACHINE CONFIGURED TO PERFORM I/O OPERATIONS BYPASSING A HYPERVISOR

(75) Inventor: Udayan Majumdar, Pune (IN)

(73) Assignee: Symantec Corporation, Mountain View, CA (US)

( * ) Notice: Subject to any disclaimer, the term of this patent is extended or adjusted under 35 U.S.C. 154(b) by 125 days.

(21) Appl. No.: 13/560,284

(22) Filed: Jul. 27, 2012

(51) Int. Cl.
  *G06F 12/08* (2006.01)
  *G06F 9/455* (2006.01)

(52) U.S. Cl.
  CPC ...... *G06F 12/08* (2013.01); *G06F 2009/45562* (2013.01); *G06F 2201/84* (2013.01)
  USPC ............ 711/162; 711/6; 711/112; 711/114; 711/154; 707/649; 718/1; 718/100

(58) Field of Classification Search
  CPC .......... G06F 12/08; G06F 2009/45562; G06F 2201/84
  USPC ........... 711/162, 6, 112, 114; 707/649; 718/1, 718/100
  See application file for complete search history.

(56) References Cited

U.S. PATENT DOCUMENTS

| | | | |
|---|---|---|---|
| 7,093,086 B1 | | 8/2006 | van Rietschote |
| 8,010,495 B1 | * | 8/2011 | Kuznetzov et al. ........... 707/649 |
| 8,046,329 B2 | * | 10/2011 | Shah et al. .................... 707/624 |
| 8,122,212 B2 | * | 2/2012 | Otani et al. .................... 711/162 |
| 8,219,769 B1 | * | 7/2012 | Wilk .............................. 711/162 |
| 8,234,469 B2 | * | 7/2012 | Ranade ......................... 711/162 |
| 8,386,428 B2 | * | 2/2013 | Kuznetzov et al. ........... 707/639 |
| 8,438,349 B2 | * | 5/2013 | Olson et al. ................... 711/162 |
| 8,473,463 B1 | * | 6/2013 | Wilk .............................. 707/647 |
| 8,495,316 B2 | * | 7/2013 | Nagarkar et al. ............. 711/162 |
| 8,572,138 B2 | * | 10/2013 | Sundar et al. ................. 707/828 |
| 2007/0208918 A1 | | 9/2007 | Harbin et al. |
| 2009/0216970 A1 | | 8/2009 | Basler et al. |
| 2010/0011178 A1 | | 1/2010 | Feathergill |
| 2010/0262797 A1 | | 10/2010 | Rosikiewicz et al. |
| 2011/0010515 A1 | * | 1/2011 | Ranade ......................... 711/162 |
| 2011/0047340 A1 | * | 2/2011 | Olson et al. ................... 711/162 |
| 2011/0191834 A1 | * | 8/2011 | Singh et al. ....................... 726/6 |
| 2011/0296412 A1 | * | 12/2011 | Banga et al. ....................... 718/1 |
| 2012/0072685 A1 | | 3/2012 | Otani |
| 2012/0265959 A1 | * | 10/2012 | Le et al. ........................ 711/162 |
| 2012/0324183 A1 | * | 12/2012 | Chiruvolu et al. ............ 711/162 |
| 2013/0055256 A1 | * | 2/2013 | Banga et al. ....................... 718/1 |

* cited by examiner

*Primary Examiner* — Stephen Elmore

(74) *Attorney, Agent, or Firm* — Meyertons, Hood, Kivlin, Kowert & Goetzel, PC

(57) ABSTRACT

A virtual machine may use a first one or more volumes in which one or more virtual disk image files are stored. The virtual machine may also use data stored in a second one or more volumes, where the virtual machine is configured to bypass a hypervisor to access the second one or more volumes. A time consistent backup of the virtual machine, including both the virtual disk image files of the first one or more volumes and the data of the second one or more volumes, may be created.

20 Claims, 5 Drawing Sheets

BACKUP OF A VIRTUAL MACHINE CONFIGURED TO PERFORM I/O OPERATIONS BYPASSING A HYPERVISOR

BACKGROUND OF THE INVENTION

1. Field of the Invention

This invention relates generally to the field of virtual computing, and more particularly, to a system and method for backing up a virtual machine that uses a storage device that bypasses the hypervisor I/O layer of the virtualization platform on which the virtual machine executes.

2. Description of the Related Art

A virtual machine (VM), also referred to as a virtual computer, is a software implementation of a machine (computer) that executes programs like a real machine. Virtualization provides the ability for multiple virtual machines to run together on the same physical computer. Each virtual machine may execute its own operating system and may appear to a user of the virtual machine to be the same as an independent physical computer. A user may interact with a virtual machine similarly as if the user were interacting with a physical computer. For example, various software applications may be installed on the virtual machine, and the virtual machine may enable the user to launch the software applications, provide input to the software applications, and view output from the software applications identically as if they were executing on a physical computer.

A virtual machine typically maintains its own set of files, similarly as a physical computer would, such as operating system files, application program files, data files, etc. Whereas the files of a physical computer are typically stored on a hard disk, files of a virtual machine are often stored in one or more virtual disk image files. A virtual disk image file represents the contents and structure of a hard disk drive, e.g., by representing disk sectors. Sectors of the virtual disk image file are allocated as necessary for storing the files used by the virtual machine. In addition to the sector data, the virtual disk image file also includes various data structures for managing the sector data, such as a sector bitmap indicating which sectors are currently in use and store valid data.

SUMMARY

Various embodiments of a system and method for backing up a virtual machine are disclosed. The virtual machine may execute within a virtualization environment that includes a hypervisor that controls access to physical resources used by the virtual machine. The virtual machine may use one or more virtual disk image files that are included in a first one or more volumes. The virtual machine may also use additional data stored in a second one or more volumes. The virtual machine may be configured to bypass the hypervisor to access the second one or more volumes.

According to some embodiments of the system and method, a first snapshot may be initiated of the first one or more volumes that include the one or more virtual disk image files and the second one or more volumes that include the additional data. The first snapshot may be based on a first point in time. In some embodiments the first snapshot may be initiated by requesting the virtual machine to initiate the first snapshot.

The system and method may operate to create a first backup image of the second one or more volumes using the first snapshot. The first backup image may be based on the first point in time. In some embodiments the first backup image of the second one or more volumes may be created by requesting the virtual machine to create the first backup image of the second one or more volumes using the first snapshot.

The system and method may further operate to initiate a second snapshot of the first one or more volumes that include the one or more virtual disk image files of the virtual machine. The second snapshot may be based on a second point in time after the first point in time. In some embodiments the second snapshot may be initiated by requesting the virtual machine host software that manages the virtual machine to initiate the second snapshot.

A second backup image of the one or more virtual disk image files of the virtual machine may be created using the second snapshot. The second backup image of the one or more virtual disk image files may be based on the second point in time. In some embodiments the second backup image may be created by requesting the virtual machine host software to create the second backup image using the second snapshot.

The second backup image of the one or more virtual disk image files is based upon the second point in time, which is a later point in time than the first point in time upon which the first backup image of the second one or more volumes is based. The system and method may operate to revert the second backup image of the one or more virtual disk image files to the first point in time using the first snapshot, e.g., to make the second backup image of the one or more virtual disk image files time consistent with the first backup image of the second one or more volumes. In some embodiments the system and method may request the virtual machine host software to mount the second backup image of the one or more virtual disk image files and revert the one or more virtual disk image files to the first point in time using the first snapshot.

In some embodiments, at the second point in time, the one or more virtual disk image files of the virtual machine may include snapshot data of the first snapshot. Thus, since the second backup image of the one or more virtual disk image files is created using the second snapshot which corresponds to the second point in time, the second backup image of the one or more virtual disk image files may include the snapshot data of the first snapshot. Reverting the second backup image of the one or more virtual disk image files of the virtual machine to the first point in time using the first snapshot may comprise reading the snapshot data of the first snapshot from the second backup image and using the snapshot data of the first snapshot to revert the second backup image of the one or more virtual disk image files of the virtual machine to the first point in time.

In various embodiments the second one or more volumes may be stored on any kind of storage device that the virtual machine is configured to access without using an input/output (I/O) layer of the hypervisor. In some embodiments the second one or more volumes may be stored on one or more physical disk drives, such as one or more disk drives configured as pass-through disks or configured to be accessed using raw device mapping (RDM), for example. In some embodiments the second one or more volumes may be stored on one or more iSCSI (Internet Small Computer System Interface) disk drives or storage area network (SAN) devices that are inaccessible to the hypervisor or virtual machine host software that implements the virtualization environment.

BRIEF DESCRIPTION OF THE DRAWINGS

A better understanding can be obtained when the following detailed description is considered in conjunction with the following drawings, in which.

Figure 1:
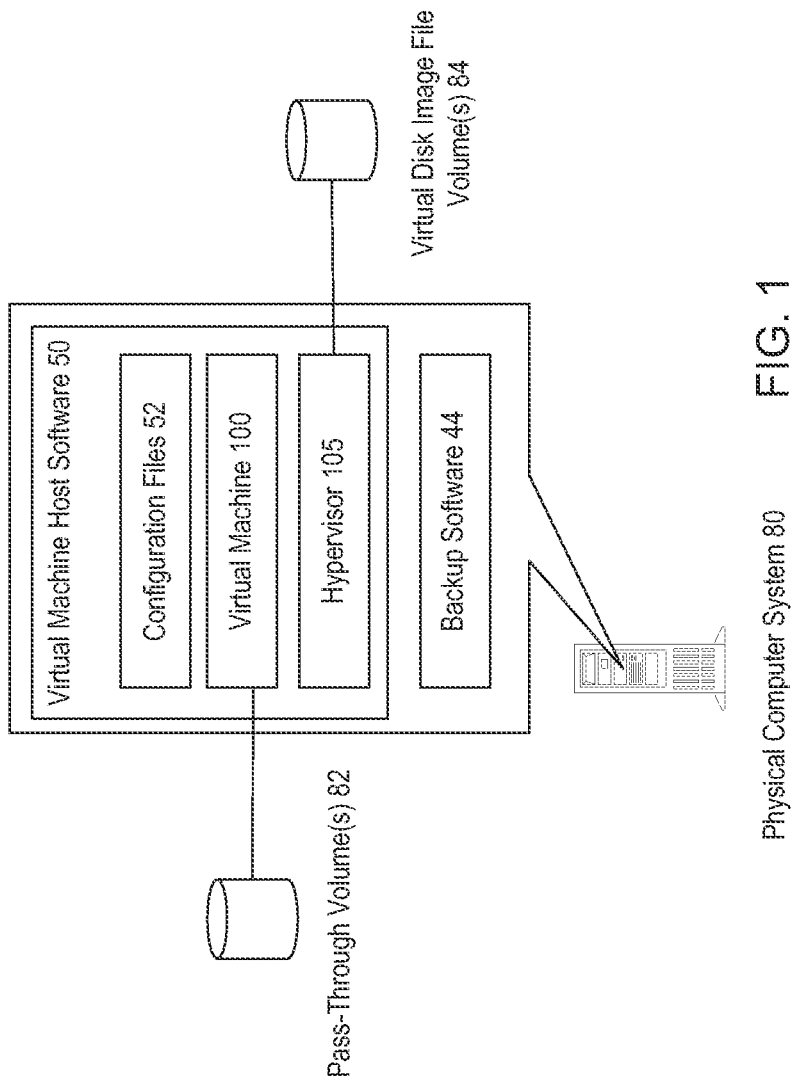
FIG. 1 illustrates an example of a virtual machine that uses one or more virtual disk image files and also uses data stored in one or more volumes that the virtual machine is configured to access without going through a hypervisor that manages the virtual machine.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates an example of a virtual machine 100 that executes on a virtualization platform implemented by virtual machine host software 50. In various embodiments the virtual machine 100 may be created and managed by any of various kinds of virtual machine host software 50. Examples of virtual machine host software include various virtualization software packages from Microsoft Corp. (e.g., Hyper-V® software) and VMWare, Inc. (e.g., ESX software), among others.

The virtual machine host software 50 may execute on a physical computer system 80. The virtual machine host software 50 may include a hypervisor 105 that functions as a layer or manager between the virtual machine 100 and the physical devices or resources of the physical computer system 80. Although only a single virtual machine 100 is illustrated in FIG. 1, multiple virtual machines may be executed on the physical computer system 80, and the hypervisor 105 may coordinate access among them to the physical resources of the physical computer system 80.

The virtual machine 100 may have one or more associated configuration files 52 that are managed by the virtual machine host software 50 and which store configuration settings for the virtual machine 100.

The virtual machine 100 may be implemented with one or more virtual disk image files. The virtual disk image files may represent one or more virtual storage devices (e.g., virtual hard disk) on which files used by the virtual machine 100 are stored, such as operating system files, application files, etc. In various embodiments, the virtual disk image file(s) of the virtual machine 100 may be any kind of virtual disk image files, e.g., may be formatted according to any specification or standard. Examples of virtual disk image file formats include the Virtual Hard Disk (VHD) format and the Virtual Machine Disk Format (VMDK) format.

The virtual disk image file(s) may be included in one or more volumes 84. (As used herein, the term "volume" refers to a set of files.) The volume(s) 84 in which the virtual disk image file(s) are included are also referred to herein as the "virtual disk image file volume(s) 84". The virtual disk image file volume(s) 84 may be stored on one or more physical storage devices included in or coupled to the physical computer system 80, such as a disk drive for example. In some embodiments the virtual disk image file volume(s) 84 may be stored on a storage device coupled to the physical computer system 80 through a network, such as a network-attached storage (NAS) device or a storage area network (SAN) device.

The hypervisor 105 of the virtual machine host software 50 may be configured to manage access by the virtual machine 100 to the virtual disk image file volume(s) 84. For example, when the virtual machine 100 performs input/output (I/O) calls to access files in the one or more virtual disk image files, the I/O calls may pass through an I/O layer of the hypervisor 105.

In addition to the data stored in the one or more virtual disk image files in the volume(s) 84, the virtual machine 100 may also use other data stored in one or more pass-through volumes 82. Unlike the volume(s) 84 in which the virtual disk image file(s) are stored, the virtual machine 100 may be configured to access the pass-through volume(s) 82 directly, e.g., bypassing the hypervisor 105. For example, when the virtual machine 100 performs an I/O call to access data in the pass-through volume(s) 82, the I/O call may not be intercepted or received by the I/O layer of the hypervisor 105. In some embodiments the pass-through volume(s) 82 may be stored on a different physical storage device than the virtual disk image file volume(s) 84. In other embodiments they may be stored on the same physical storage device. The data in the pass-through volume(s) 82 is referred to herein as pass-through data.

Various virtual machine host software environments may provide various features such as pass-through disks (e.g., supported by Microsoft Corp. Hyper-V virtual machine host software) and raw device mapping (RDM, e.g., supported by VMWare, Inc. virtual machine host software) that can be used to implement the pass-through volume(s) 82. As another example, the pass-through volume(s) 82 may be stored on one or more iSCSI (Internet Small Computer System Interface) disk drives or storage area network (SAN) devices that are not accessible by the virtual machine host software 50 and hypervisor 105.

Bypassing the hypervisor 105 may enable the I/O operations of the virtual machine 100 to be performed faster when accessing the pass-through volume(s) 82. However, since the virtual machine 100 bypasses the hypervisor 105 to access the pass-through volume(s) 82 directly, the virtual machine host software 50 may not have knowledge of or may not be able to access the pass-through volume(s) 82. This may make it difficult to create a backup of the virtual machine 100.

To create a backup of the virtual machine 100, all the data used by the virtual machine 100 needs to be backed up, including both the volume(s) 84 that store the virtual disk image file(s) and the pass-through volume(s) 82. Some conventional backup software operates to create a backup of a virtual machine by calling an application programming interface (API) of the virtual machine host software 50 to request the virtual machine host software 50 to perform the backup. However, in a system such as illustrated in FIG. 1, the virtual machine host software 50 may not be able to create a complete backup of the virtual machine 100 since the pass-through volume(s) 82 may not be accessible to the virtual machine host software 50. To overcome this problem, the system may include backup software 44 which is configured to create a complete backup of the virtual machine 100 as described below with reference to the flowchart of FIG. 3.

In some embodiments the backup software 44 that executes on the physical computer system 80 may act as a backup agent which communicates with other backup software executing on another computer system. For example, in some embodiments the system of FIG. 1 may include a physical backup server computer system (not shown) which is coupled to the physical computer system 80 via a network and which communicates with the backup software 44 on the physical computer system 80 to cause the backup software 44 to backup the virtual machine(s) 100 that execute on the physical computer system 80.

Figure 2:
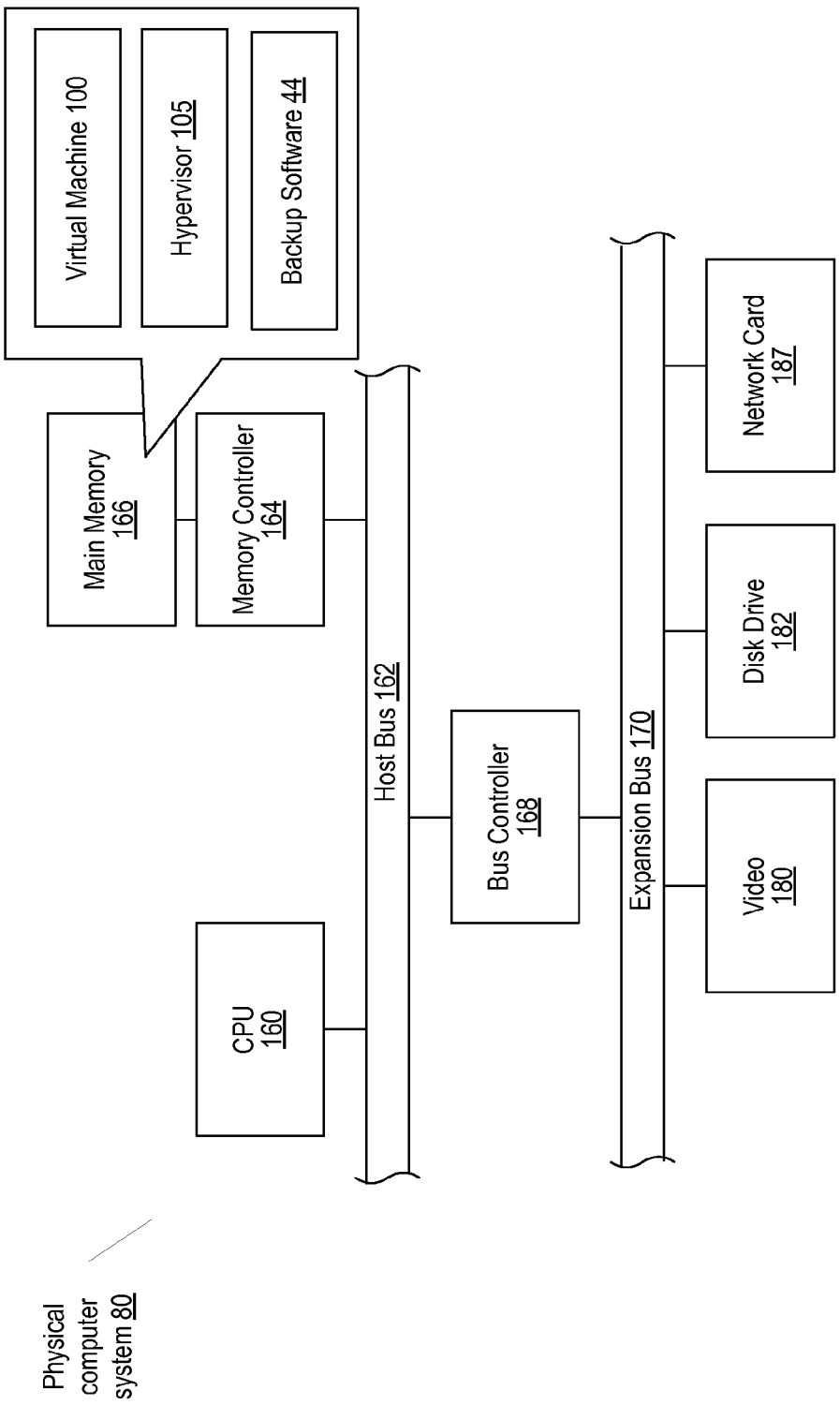
FIG. 2 illustrates one embodiment of a physical computer system on which the virtual machine may execute.

FIG. 2 illustrates one embodiment of the physical computer system 80 in more detail. In general, the physical computer system 80 may include any kind of computing device (s), such as one or more personal computer systems (PC), workstations, network appliances, distributed computer systems, or other computing devices or combinations of devices. In general, the term "computer system" is broadly defined to encompass any device (or combination of devices) having at least one processor that executes instructions from one or more storage mediums. FIG. 2 illustrates a representative PC embodiment. Elements of a computer not necessary to understand the present description have been omitted for simplicity.

The physical computer system 80 may include at least one central processing unit or CPU (processor) 160 which may be coupled to a processor or host bus 162. The processor 160 may be any of various types. For example, in some embodiments, the processor 160 may be compatible with the x86 architecture, while in other embodiments the processor 160 may be compatible with the SPARC™ family of processors. Also, in some embodiments the physical computer system 80 may include multiple processors 160.

The physical computer system 80 may also include memory 166 in which program instructions implementing the virtual machine 100, the hypervisor 105, and other components of the virtual machine host software 50 may be stored. In some embodiments the memory 166 may also store the backup software 44 that executes to backup the virtual machine 100 according to the method described below. In some embodiments the backup software 44 that executes on the physical computer system 80 may be a client portion of the backup software 44, e.g., where the backup software 44 also includes a server portion that executes on a separate backup server physical computer that manages backup operations performed for the physical computer system 80. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the physical computer system 80. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, and a network card or device 187 that enables the physical computer system 80 to send and receive information over a network.

In the example of FIG. 2, a disk drive 182 is also coupled to the expansion or input/output bus 170. In some embodiments the storage volume(s) 84 that include the virtual disk image file(s) of the virtual machine 100 and/or the pass-through volume(s) 82 may be stored on the disk drive 182. In other embodiments the storage volume(s) 84 and/or the pass-through volume(s) 82 may be stored across multiple disk drives, or may be stored on another kind of storage device other than a disk drive. Examples of other kinds of storage devices include solid state drives, optical drives, tape drives, etc. The storage device(s) on which the storage volume(s) 84 and the pass-through volume(s) 82 are stored may be included in or coupled to the physical computer system 80 in any of various ways, e.g., via an input/output bus, via a network, via a wireless connection, etc.

The physical computer system 80 may communicate with one or more other computer systems or storage devices via any type of network or combination of networks. For example, the physical computer system 80 may be coupled to a local area network (LAN), a wide area network (WAN), a wireless network, an Intranet, the Internet, etc. Examples of local area networks include Ethernet networks, Fiber Distributed Data Interface (FDDI) networks, and token ring networks. The physical computer system 80 may be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11, among others.

Figure 3:
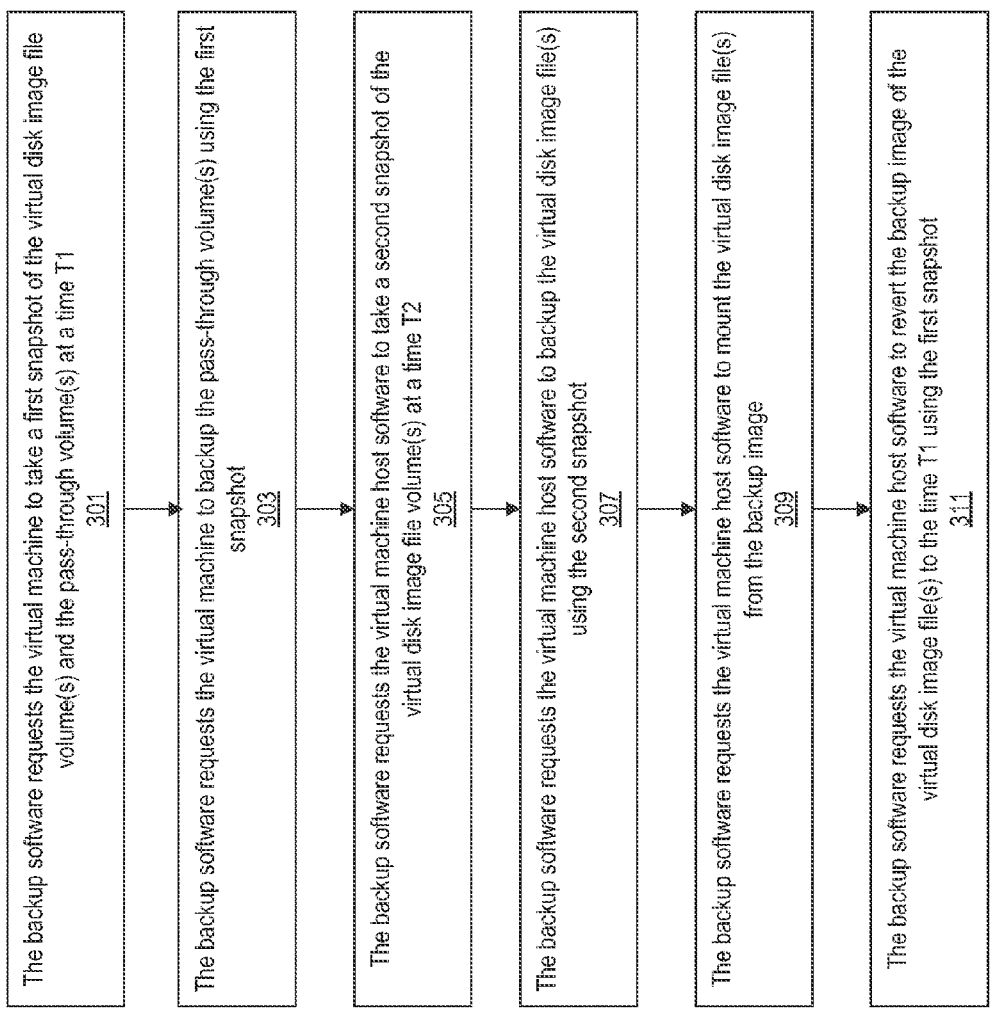
FIG. 3 is a flowchart diagram illustrating one embodiment of a method for backing up the virtual machine.

FIG. 3 is a flowchart diagram illustrating one embodiment of a method for backing up the virtual machine 100. The method may be performed by the backup software 44 executing on the physical computer system 80 and/or executing in conjunction with a portion of the backup software 44 executing on a separate backup server computer system. In various embodiments the flowchart operations may be combined, omitted, modified, or performed in different orders than shown in FIG. 3.

The method of FIG. 3 may enable the virtual machine 100 to be backed up while it is being executed by the physical computer 80, e.g., without stopping the virtual machine 100 or taking it offline. This may be advantageous since the virtual machine 100 can continue performing tasks while the backup occurs.

Figure 4:
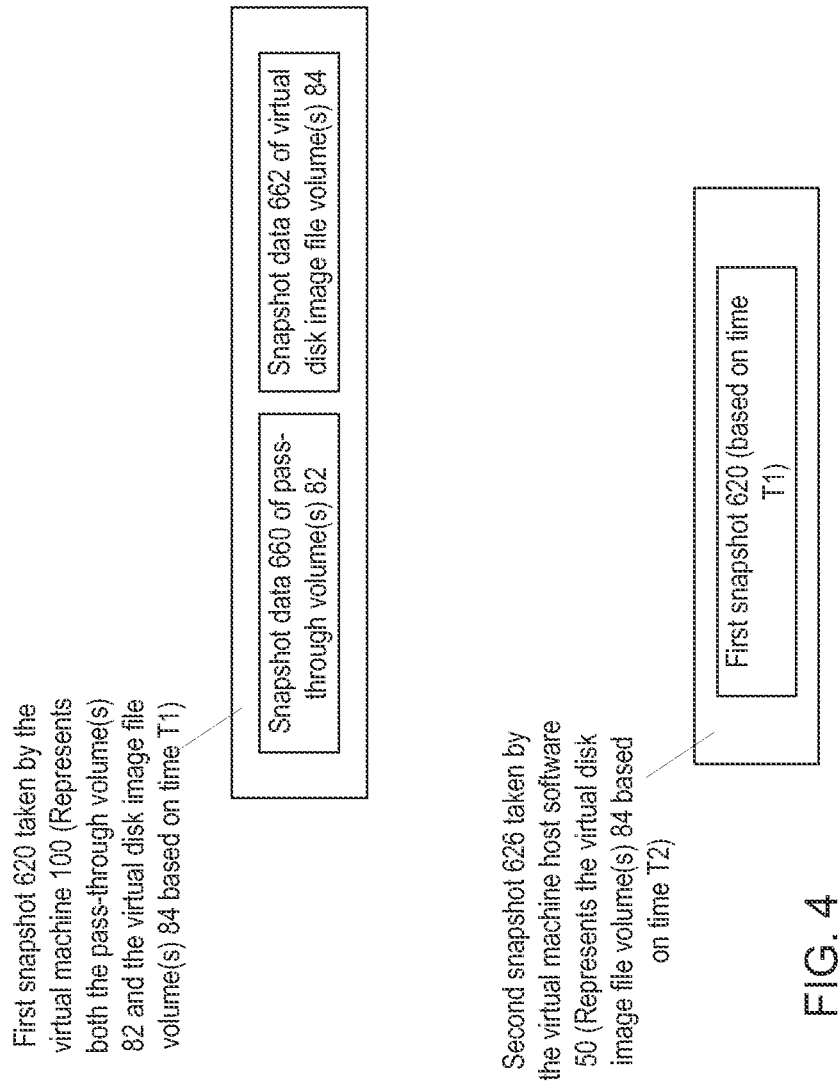
FIG. 4 illustrates an example of snapshots created by the method of FIG. 3 when backing up the virtual machine.

As indicated in block 301, the backup software 44 may request the virtual machine 100 to initiate a first snapshot of the virtual disk image file volume(s) 84 and the pass-through volume(s) 82 at a time T1. In response, the virtual machine 100 initiates the first snapshot. The first snapshot enables a point-in-time representation of the virtual disk image file volume(s) 84 and the pass-through volume(s) 82, e.g., to represent the volume(s) 84 and the volume(s) 82 as they exist at the time T1. FIG. 4 illustrates an example of a first snapshot 620 taken by the virtual machine 100 in response to the request by the backup software 44. If any data blocks in the pass-through volume(s) 82 are changed after the first snapshot is initiated, the old data from those data blocks may be copied into the first snapshot 620 (illustrated in FIG. 4 as the snapshot data 660). Similarly, if any data blocks in the virtual disk image file volume(s) 84 are changed after the first snapshot is initiated, the old data from those data blocks may be copied into the first snapshot 620 (illustrated in FIG. 4 as the snapshot data 662). Thus, the state of the pass-through volume(s) 82 and the state of the virtual disk image file volume(s) 84 at the time T1 are effectively saved via the first snapshot 620.

In various embodiments, the virtual machine 100 may initiate or implement the first snapshot using any of various snapshot techniques. For example, in some embodiments an operating system or file system of the virtual machine 100 may provide a service that the virtual machine 100 can call to initiate a first snapshot representing the volume(s) 82 and the volume(s) 84 at the point in time T1. In various embodiments, various kinds of snapshots may be initiated or created. For example, in some embodiments the first snapshot may be a copy-on-write (COW) snapshot.

Although the virtual machine host software 50 may not be able to access the pass-through volume(s) 82, the virtual machine 100 itself can access the pass-through-volume(s) 82. Thus, the virtual machine 100 is able to create a backup of the pass-through volume(s) 82. As indicated in block 305, the backup software 44 may request the virtual machine 100 to backup the pass-through volume(s) 82 using the first snapshot. In some embodiments the virtual machine 100 may support an API which the backup software 44 can call to request the virtual machine 100 to backup the pass-through volume(s) 82. In other embodiments the backup software 44 may configure the virtual machine 100 to execute backup software to perform the backup of the pass-through volume(s) 82.

In response to receiving the request in block 303, the virtual machine 100 may copy the files or data blocks of the pass-through volume(s) 82 to a backup image based on the first snapshot. (As used herein, the term "backup image" refers to any set of data created to represent another set of data at a particular point in time. A backup image may be stored in the form of one or more files or as data stored in a database.) For each data block of the pass-through volume(s) 82, if the data block has not changed since the first snapshot was initiated then the virtual machine 100 may read the data block from the pass-through volume(s) 82. Otherwise if the data block has changed since the first snapshot was initiated then the virtual machine 100 may read the old value of the data block from the first snapshot. As a result, the backup image created by the virtual machine 100 may represent the pass-through volume (s) 82 at the time T1 upon which the first snapshot is based.

Once the backup of the pass-through volume(s) 82 has been created, the virtual disk image file(s) of the virtual machine 100 still need to be backed up. It may be desirable for the backup of the virtual disk image file(s) to be created by the virtual machine host software 50 instead of the virtual machine 100. For example, the virtual machine host software 50 can store the configuration files 52 of the virtual machine 100 along with the backup, whereas the configuration files 52 may not be accessible by the virtual machine 100 itself. Also, the virtual machine host software 50 may provide an application programming interface (API) for backing up a virtual machine, and it may be desirable to leverage this API to perform the backup.

As indicated in block 305, the backup software 44 may request the virtual machine host software 50 to initiate a second snapshot of the virtual disk image file volume(s) 84 at a time T2 after the time T1. In response, the virtual machine host software 50 may initiate the second snapshot at the time T2. FIG. 4 illustrates an example of a second snapshot 626 taken by the virtual machine host software 50. The data of the first snapshot 620 corresponding to the time T1 may be stored in the virtual disk image file(s) of the virtual machine 100. Since the second snapshot of the virtual disk image file volume(s) 84 is taken at the time T2 which is after the time T1 when the first snapshot was initiated, and since the data of the first snapshot 620 is within the data of the virtual disk image file(s) in the volume(s) 84, the second snapshot 626 effectively captures the first snapshot 620, as illustrated in FIG. 4.

As indicated in block 305, the backup software 44 may request the virtual machine host software 50 to backup the virtual disk image file(s) from the volume(s) 84 using the second snapshot. For example, the virtual machine host software 50 may provide an API that the backup software 44 can invoke to request the virtual machine host software 50 to backup the virtual disk image file(s). In response to the request, the virtual machine host software 50 may create a backup image of the virtual disk image file(s) of the virtual machine 100 based on the second snapshot. The backup image may include a complete copy of the virtual disk image file(s) as they existed at the time T2. The virtual machine host software may also backup the configuration file(s) 52 for the virtual machine 100.

The backup images created by the virtual machine 100 and the virtual machine host software 50 may include all the data of the virtual machine 100. However, the backup images may not be time consistent with each other since the backup image of the pass-through volume(s) 82 is based on the first snapshot corresponding to the time T1, and the backup image of the virtual disk image file(s) is based on the second snapshot corresponding to the time T2. In order for the backup image of the virtual disk image file(s) to be made consistent with the backup image of the pass-through volume(s) 82, the backup software 44 may request the virtual machine host software 50 to mount the virtual disk image file(s) from the backup image, as indicated in block 309. (As used herein, "mounting" a virtual disk image file refers to configuring the files contained within the virtual disk image file to be viewed by the file system as an active volume.) The virtual machine host software 50 may provide an API which the backup software 44 can call to request the virtual disk image file(s) to be mounted, e.g., so that the files contained in the virtual disk image file(s) can be browsed.

As noted above, the second snapshot 626 effectively captures the first snapshot 620, as illustrated in FIG. 4. Thus, since the backup image of the virtual disk image file(s) was created based on the second snapshot, the backup image of the virtual disk image file(s) includes the snapshot data of the first snapshot. Once the virtual disk image file(s) have been mounted from the backup image, the first snapshot is accessible from the mounted virtual disk image file(s). As indicated in block 311, the backup software 44 may request the virtual machine host software 50 to revert the backup image of the virtual disk image file(s) to the time T1 using the first snapshot. The virtual machine host software 50 may provide an API that the backup software 44 calls to request the virtual machine host software to perform the reversion, e.g., by passing an ID of the first snapshot to the virtual machine host software and requesting the reversion to be performed based on the first snapshot. The virtual machine host software 50 may then revert the virtual disk image file(s) to the first snapshot (e.g., revert the virtual disk image file(s) to their earlier state as represented by the first snapshot). For example, the virtual machine host software 50 may use the first snapshot ID to read the snapshot data of the first snapshot from the virtual disk image file(s) mounted from the backup image, and may use the snapshot data to revert the virtual disk image file(s) to their state as they existed at the time T1. The reverted virtual disk image file(s) will then correspond to the same point in time T1 as the backup image of the pass-through volume(s) 82 so that the reverted virtual disk image file(s) are time consistent with the backup image of the pass-through volume(s) 82.

In some embodiments the virtual disk image file(s) may be reverted to the first snapshot as part of the backup process. For example, after the virtual disk image file(s) have been reverted, the original backup image of the virtual disk image file(s) may be replaced by a new backup image of the reverted virtual disk image file(s). If a user or administrator later wants to restore the virtual machine, the backup image of the reverted virtual disk image file(s) and the backup image of the pass-through volume(s) 82 may be used to restore the virtual machine 100 to the time T1.

In other embodiments the virtual disk image file(s) may not be reverted to the first snapshot as part of the backup process, but instead may be reverted as part of the restore process. For example, in response to a user or administrator later requesting to restore the virtual machine, the backup image of the virtual disk image file(s) may be mounted and reverted to the first snapshot. It is possible to do the reversion at the time of the restore since the data of the first snapshot is stored in the backup image of the virtual disk image file(s) which is created from the second snapshot.

In some embodiments the first snapshot and the second snapshot may both be released after the backup image of the virtual disk image file(s) has been created by the virtual machine host software 50. (The first snapshot does not need to continue being maintained after this point since the backup image of the virtual disk image file(s) will have the data for the first snapshot up to the time T2.)

Figure 5:
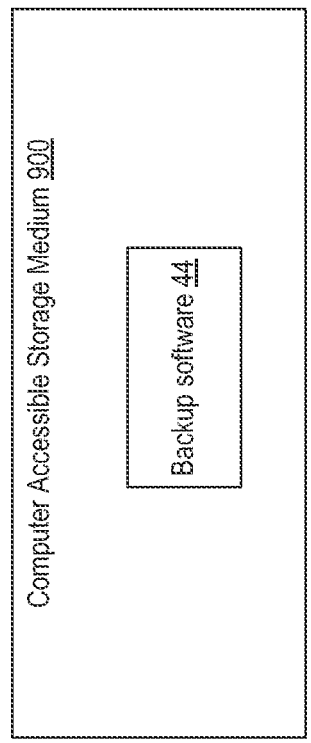
FIG. 5 illustrates a computer accessible storage medium.

Turning now to FIG. 5, a block diagram of a computer accessible storage mediums 900 is shown. The computer accessible storage medium 900 may store program instructions of the backup software 44. The program instructions stored on the computer accessible storage medium 900 may be executable by one or more processors to implement various functions described above. In some embodiments, a portion of the backup software 44 may be executed by the physical computer system 80 on which the virtual machine 100 executes, and another portion of the backup software 44 may be executed by another physical computer system, such as a backup server computer system. Generally speaking, various embodiments of a computer accessible storage medium are contemplated for storing any set of instructions which, when executed, implement a portion or all of the functions described above.

A computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to perform operations including:

initiating a first snapshot of a first one or more volumes that include one or more virtual disk image files of a virtual machine and a second one or more volumes that include data written by the virtual machine, wherein the first snapshot is based on a first point in time, wherein the virtual machine uses physical resources of a physical computer system, wherein a hypervisor controls access to the physical resources by the virtual machine, wherein the virtual machine is configured to bypass the hypervisor to access the second one or more volumes;

creating a first backup image of the second one or more volumes using the first snapshot, wherein the first backup image of the second one or more volumes is based on the first point in time;

initiating a second snapshot of the first one or more volumes that include the one or more virtual disk image files of the virtual machine, wherein the second snapshot is based on a second point in time after the first point in time;

creating a second backup image of the one or more virtual disk image files of the virtual machine using the second snapshot, wherein the second backup image of the one or more virtual disk image files is based on the second point in time; and reverting the second backup image of the one or more virtual disk image files of the virtual machine to the first point in time using the first snapshot in order to make the second backup image of the one or more virtual disk image files time consistent with the first backup image of the second one or more volumes.

2. The non-transitory computer-accessible storage medium of claim 1, wherein the second one or more volumes are stored on one or more physical disk drives, wherein the virtual machine is configured to bypass the hypervisor to access the second one or more volumes on the one or more physical disk drives.

3. The non-transitory computer-accessible storage medium of claim 1, wherein the second one or more volumes are stored on one or more iSCSI disk drives, wherein the virtual machine is configured to bypass the hypervisor to access the second one or more volumes on the one or more iSCSI disk drives.

4. The non-transitory computer-accessible storage medium of claim 1, wherein the second one or more volumes are stored on one or more storage area network (SAN) devices, wherein the virtual machine is configured to bypass the hypervisor to access the second one or more volumes on the one or more SAN devices.

5. The non-transitory computer-accessible storage medium of claim 1, wherein the program instructions are executable by the one or more processors to request the virtual machine to perform said initiating the first snapshot.

6. The non-transitory computer-accessible storage medium of claim 1, wherein the program instructions are executable by the one or more processors to request the virtual machine to perform said creating the first backup image of the second one or more volumes using the first snapshot.

7. The non-transitory computer-accessible storage medium of claim 1, wherein the program instructions are executable by the one or more processors to request host software that manages the virtual machine to perform said initiating the second snapshot of the first one or more volumes.

8. The non-transitory computer-accessible storage medium of claim 1, wherein the program instructions are executable by the one or more processors to request host software that manages the virtual machine to perform said creating the second backup image of the one or more virtual disk image files of the virtual machine.

9. The non-transitory computer-accessible storage medium of claim 1, wherein the program instructions are further executable by the one or more processors to perform:
mounting the one or more virtual disk image files of the virtual machine from the second backup image prior to reverting the second backup image of the one or more virtual disk image files of the virtual machine to the first point in time.

10. The non-transitory computer-accessible storage medium of claim 1, wherein the program instructions are further executable by the one or more processors to perform:
receiving a request to restore the virtual machine;
wherein the program instructions are executable by the one or more processors to perform said reverting the second backup image of the one or more virtual disk image files of the virtual machine to the first point in time using the first snapshot in response to said receiving the request to restore the virtual machine.

11. The non-transitory computer-accessible storage medium of claim 1,
wherein, at the second point in time, the one or more virtual disk image files of the virtual machine include snapshot data of the first snapshot, wherein the second backup image of the one or more virtual disk image files includes the snapshot data of the first snapshot.

12. The non-transitory computer-accessible storage medium of claim 11,
wherein said reverting the second backup image of the one or more virtual disk image files of the virtual machine to the first point in time using the first snapshot comprises reading the snapshot data of the first snapshot from the second backup image and using the snapshot data of the first snapshot to revert the second backup image of the one or more virtual disk image files of the virtual machine to the first point in time.

13. A method comprising:
one or more processors initiating a first snapshot of a first one or more volumes that include one or more virtual disk image files of a virtual machine and a second one or more volumes that include data written by the virtual machine, wherein the first snapshot is based on a first point in time, wherein the virtual machine uses physical resources of a physical computer system, wherein a hypervisor controls access to the physical resources by the virtual machine, wherein the virtual machine is configured to bypass the hypervisor to access the second one or more volumes;
the one or more processors creating a first backup image of the second one or more volumes using the first snapshot, wherein the first backup image of the second one or more volumes is based on the first point in time;
the one or more processors initiating a second snapshot of the first one or more volumes that include the one or more virtual disk image files of the virtual machine, wherein the second snapshot is based on a second point in time after the first point in time;
the one or more processors creating a second backup image of the one or more virtual disk image files of the virtual machine using the second snapshot, wherein the second backup image of the one or more virtual disk image files is based on the second point in time; and
the one or more processors reverting the second backup image of the one or more virtual disk image files of the virtual machine to the first point in time using the first snapshot in order to make the second backup image of the one or more virtual disk image files time consistent with the first backup image of the second one or more volumes.

14. The method of claim 13,
wherein the second one or more volumes are stored on one or more physical disk drives, wherein the virtual machine is configured to bypass the hypervisor to access the second one or more volumes on the one or more physical disk drives.

15. The method of claim 13,
wherein said creating the first backup image of the second one or more volumes using the first snapshot comprises the one or more processors requesting the virtual machine to create the first backup image of the second one or more volumes using the first snapshot.

16. The method of claim 13,
wherein said creating the second backup image of the one or more virtual disk image files of the virtual machine comprises the one or more processors requesting host software that manages the virtual machine to create the second backup image of the one or more virtual disk image files of the virtual machine.

17. The method of claim 14, further comprising:
the one or more processors mounting the one or more virtual disk image files of the virtual machine from the second backup image prior to reverting the second backup image of the one or more virtual disk image files of the virtual machine to the first point in time.

18. A system comprising:
one or more processors; and
memory storing program instructions, wherein the program instructions are executable by the one or more processors to perform operations including:
initiating a first snapshot of a first one or more volumes that include one or more virtual disk image files of a virtual machine and a second one or more volumes that include data written by the virtual machine, wherein the first snapshot is based on a first point in time, wherein the virtual machine uses physical resources of a physical computer system, wherein a hypervisor controls access to the physical resources by the virtual machine, wherein the virtual machine is configured to bypass the hypervisor to access the second one or more volumes;
creating a first backup image of the second one or more volumes using the first snapshot, wherein the first backup image of the second one or more volumes is based on the first point in time;
initiating a second snapshot of the first one or more volumes that include the one or more virtual disk image files of the virtual machine, wherein the second snapshot is based on a second point in time after the first point in time;
creating a second backup image of the one or more virtual disk image files of the virtual machine using the second snapshot, wherein the second backup image of the one or more virtual disk image files is based on the second point in time; and
reverting the second backup image of the one or more virtual disk image files of the virtual machine to the first point in time using the first snapshot in order to make the second backup image of the one or more virtual disk image files time consistent with the first backup image of the second one or more volumes.

19. The system of claim 18,
wherein the second one or more volumes are stored on one or more physical disk drives, wherein the virtual machine is configured to bypass the hypervisor to access the second one or more volumes on the one or more physical disk drives.

20. The system of claim 18, wherein the program instructions are executable by the one or more processors to request the virtual machine to perform said creating the first backup image of the second one or more volumes using the first snapshot.

* * * * *